United States Patent Office 3,143,551
Patented Aug. 4, 1964

3,143,551
DERIVATIVES OF INDOLE
Albert Hofmann and Franz Troxler, Bottmingen, Basel-Land, Switzerland, assignors to Sandoz Ltd., Basel, Switzerland, a Swiss firm
No Drawing. Filed Oct. 24, 1961, Ser. No. 147,158
Claims priority, application Switzerland Oct. 26, 1960
4 Claims. (Cl. 260—319)

The present invention relates to new indole derivatives and to a process for their production. More particularly, the invention is concerned with compounds having the formula

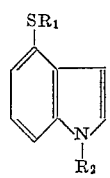

I in which $R_1$ signifies a lower alkyl radical or an aralkyl radical, and $R_2$ signifies a hydrogen atom, or a lower alkyl or alkenyl radical, or an aralkyl radical.

The invention also provides a process for the production of said compounds I, characterized in that a substituted nitrotoluene of Formula II,

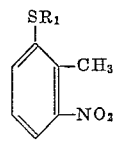

II in which $R_1$ has the above significance, is condensed in the presence of an alkali metal alcoholate with an oxalic acid diester, the resulting phenyl-pyruvic acid ester of Formula IIIa,

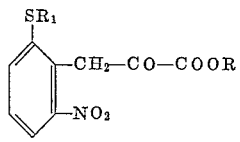

IIIa in which R signifies the radical of any alcohol, preferably a lower alkyl radical, is saponified to the corresponding acid of Formula III

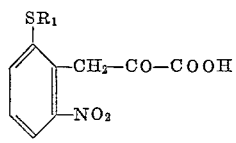

III which is cyclized in the presence of sodium dithionite of ferrous hydroxide to an indole-2-carboxylic acid of Formula IV

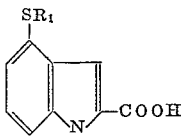

IV

Alternatively, the compound IV may also be prepared by cyclizing the ester IIIa in the above manner, and saponifying the resulting indole-2-carboxylic acid ester of Formula IVa

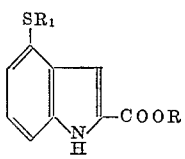

IVa

The acid IV is then decarboxylated and, if desired, the resulting indole, substituted in the 4 position, treated in the presence of an alkaline condensing agent with a lower alkyl or alkenyl halide, or an aralkyl halide.

The process may, for example, be effected as follows: An oxalic acid diester, e.g. oxalic acid diethyl ester, is mixed with a compound II, e.g. 2-nitro-6-methylthiotoluene, in the presence of an alkali metal alcoholate, e.g. potassium ethylate, and the reaction mixture left to stand for 4 to 10 days at ambient temperature. The condensation reaction may be effected in an anhydrous aliphatic alcohol, e.g. methanol or ethanol, or in an inert organic solvent, e.g. ether, benzene or toluene. When the reaction is effected in an inert solvent, the potassium enolate of the phenyl pyruvic acid ester generally crystallises, and is filtered off and saponified with excess dilute alkali metal hydroxide at ambient temperature to form the compound III. By acidifying the alkaline solution, the free acid is obtained as a yellow orange oil or yellow crystals.

Should the above mentioned potassium enolate not crystallise, then it may, for example, be worked up as follows: The solution is shaken between ether and an excess of dilute alkali metal hydroxide, the aqueous solution left to stand for a few minutes at room temperature and then acidified. Should the separated free acid not crystallise, then the aqueous alkaline solution may be used for the next step.

The cyclisation to form the indole is preferably effected in an aqueous solution and, as already indicated above, in the presence of sodium dithionite ($Na_2S_2O_4$) or of ferrous hydroxide. Preferably 1 mol of compound II and 1 mol of alkali hydroxide are dissolved in water, 1 mol of dilute alkali hydroxide is added dropwise to the solution at a temperature of 10–15° C. and, simultaneously, enough sodium dithionite added to ensure that a sample of the reaction solution no longer gives a red colour upon further addition of alkali hydroxide. Alternatively, the compound III may be dissolved in an excess of sodium or potassium hydroxide or in water containing 1 mol of sodium or potassium hydroxide, the addition of a further mol of said alkali being dispensed with. When this procedure is used, however, the yield is relatively poor. After the reaction has gone to completion (no red colour with excess alkali) the solution is slowly acidified, the indole carboxylic acid of general Formula IV separating in a crystalline condition.

The decarboxylation is preferably effected by heating the carboxylic acid in a vacuum at a temperature of 150–260° C. After carbon dioxide has ceased to evolve, compound I is distilled in a high vacuum. To obtain a high yield at the decarboxylation reaction, it is necessary for the acid IV to be free of sulphur and sulphur-containing inorganic impurities. The necessary degree of purity may be attained by recrystallisation, e.g. from ethanol/glacial acetic acid, or by boiling with carbon disulphide.

The reaction with an alkyl, alkenyl or aralkyl halogenide is effected either in liquid ammonia with an alkali amide as condensing agent, or in an inert organic solvent, e.g., ether, benzene or toluene, at room temperature or slightly higher, whilst using a basic condensing agent, preferably sodium hydride.

Compounds I have thus far not been described in the literature. At room temperature, they are oils or crystalline substances having a low melting point; they have an intense characteristic smell. With Keller's colour reagent (ferric chloride containing glacial acetic acid and concentrated sulphuric acid) and Van Urk's reagent (p-dimethylaminobenzaldehyde and dilute sulphuric acid) they give characteristic colour reactions.

Compounds I may be used as scents or in the perfumery. Due to their odour, they may further be used in agriculture for attracting bee swarms or for attracting or repelling other insects. They also are intermediate products in the production of new indole compounds. For example, indole derivatives of the Formula V

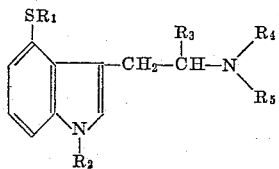

in which $R_3$, $R_4$ and $R_5$ signify an hydrogen atom, or a lower alkyl or an aralkyl radical, may be prepared by using compounds I as starting materials. Compounds V have stimulating properties: for example, they stimulate spinal reflexes as well as motor activity and inhibit the sedative or depressive action of reserpine. Aside from these general stimulating properties, they also stimulate autonomic, particularly sympathomimetic functions and display serotonin-antagonizing properties. They may be used for the treatment of various psychic illnesses.

Compounds II may, for example, be produced as follows: a 2-nitro-6-aminotoluene is diazotised and the diazonium salt converted with a mercaptan of general formula $R_1$—SH (where $R_1$ has the above significance), for example methyl, ethyl or benzyl mercaptan, to form the corresponding 2-nitro-6-(alkyl or aralkylthio)-toluene. For this purpose the diazonium salt is added dropwise to a suspension of copper powder and an excess of mercaptan in dilute alkali at a temperature of 0° C. while stirring.

In the following non-limitative examples all temperatures are stated in degrees centigrade and the melting and boiling points are uncorrected.

EXAMPLE 1.—4-METHYLTHIO-INDOLE (a) *2-nitro-6-methylthio-toluene.*—A mixture of 425 g. of 2-nitro-6-amino-toluene, 189 cc. of concentrated sulphuric acid, 4 liters of water and 2.5 kg. of ice are diazotised at 0° by adding a solution of 210 g. of sodium nitrite in 350 cc. of water dropwise. After 30 minutes the mixture is brought to a pH value of 6 by the addition of sodium acetate and the solution added at 0° to a mixture of 200 g. of sodium hydroxide, 2 liters of water, 200 cc. of liquid methylmercaptan and 200 g. of copper bronze, while stirring. Gaseous methylmercaptan is passed through for a further 15 minutes, 1.5 kg. of common salt added and the mixture left to be stirred in an ice bath over night. The mixture is acidified with concentrated hydrochloric acid, extracted 7 times with 2.5 liters of chloroform, the chloroform extract dried over magnesium sulphate and potash (1:1) and then evaporated. The residue is distilled in a high vacuum. Boiling point 130°/0.2 mm. of Hg. For analysis the mixture is sublimated in a high vacuum at 40–45°. Melting point 56–58°.

(b) *(2 - nitro-6-methylthio-phenyl) - pyruvic acid.*—A solution of 9.5 g. of 2-nitro-6-methylthio - toluene and 15.3 g. of oxalic acid diethyl ester in 50 cc. of ether are added dropwise to a solution of potassium ethylate, prepared from 3.53 g. of potassium and 16 cc. of absolute ethanol in 150 cc. of ether, at 0°. After standing for 10 days at room temperature the precipitate is filtered off with suction, washed with ether and then shaken with 100 cc. of ether, 150 cc. of water and 30 cc. of a 2 N sodium hydroxide solution for one hour at room temperature. The ethereal phase is separated, shaken again in 100 cc. of water, the aqueous solution filtered through highly purified fuller's earth until clear and slowly acidified with concentrated hydrochloric acid at 0°. The oily (2-nitro-6-methylthio-phenyl)-pyruvic acid precipitating is extracted with chloroform and crystallises from benzene in druses having a melting point of 107–109°.

(c) *4-methylthio-indole-2-carboxylic acid.*—10 g. of sodium dithionite are added portionwise to a solution of 6.651 g. of (2-nitro-6-methylthio-phenyl)-pyruvic acid in 50 cc. of water containing 26 cc. of 1 N sodium hydroxide solution while stirring and cooling with ice. A further 20 cc. of 1 N sodium hydroxide solution are added, the mixture is filtered through highly purified fuller's earth after 30 minutes and the filtrate slowly acidified with 2 N hydrochloric acid. The precipitated carboxylic acid is filtered off with suction and recrystallised from ethanol (needles), methanol/benzene (needles) and from ethanol/glacial acetic acid (needles). Melting point 244–246°. Keller's colour reaction negative. Van Urk's colour reaction: negative.

(d) *4-methylmercapto-indole.*—1.2 g. of 4-methylthio-indole-2-carboxylic acid are decarboxylated in a distillation column at a pressure of 15 mm. of Hg and 260–270° The mixture is subsequently distilled in a high vacuum at 0.02 mm. of Hg and 180°. The distillate is taken up in ether, shaken twice with a 10% soda solution and the ethereal solution dried over potash. The evaporation residue of the solution is again distilled at 0.05 mm. of Hg and 145–155°. Melting point of the solidified distillate 44–47°. Keller's colour reaction: brown-violet. Van Urk's colour reaction: blue tinged with violet.

EXAMPLE 2.—4-BENZYLTHIO-INDOLE (a) *2-nitro-6-benzylthio-toluene.*—369 g. of 2-nitro-6-amino-toluene are diazotised in a manner analogous to that described in Example 1. After 30 minutes the solution is brought to a pH value of 6 by the addition of sodium acetate and the solution added portionwise to a mixture of 300 g. of benzylmercaptan, 282.2 g. of sodium hydroxide, 172.5 g. of copper bronze and 1.5 liters of water, while stirring. After working up in a manner analogous to that described in Example 1 the resulting, dried chloroform extract is concentrated until the 2-nitro-6-benzylthio-toluene crystallises. The crystallate is filtered with suction and dried. Melting point 106–108°.

(b) *(2-nitro-6-benzylthio-phenyl)-pyruvic acid.*—A solution of 725 g. of oxalic acid diethyl ester and 442.5 g. of 2-nitro-6-benzylthio-toluene in 3 liters of tetrahydrofuran are added dropwise to a potassium ethylate solution, prepared from 189 g. of potassium and 850 cc. of ethanol in 2 liters of absolute tetrahydrofuran, cooled to 0°. After the mixture has stood for 12 days at room temperature, the tetrahydrofuran is distilled off, 3 liters of ether are added to the residue and after a short while the mixture decanted. The residue remaining in the flask is dissolved in the required quantity of water (about 6–7 liters) with the addition of a 40% solution of sodium hydroxide, the mixture filtered and then strongly acidified with concentrated hydrochloric acid. The oily (2-nitro-6-benzylthio-phenyl)-pyruvic acid is extracted with chloroform and the chloroform extract dried over magnesium sulphate/potash (1:1) and evaporated.

(c) *4-benzylthio-indole-2-carboxylic acid.*— 400 g. of raw oily (2-nitro-6-benzylthio-phenyl)-pyruvic acid are dissolved in 1 liter of benzene and diluted with 475 cc. of a 2 N sodium hydroxide solution and quickly shaken with 2 liters of water. The combined red coloured aqueous extracts are filtered through highly purified fuller's earth and 624 g. of sodium dithionite and 475 cc. of a 2 N sodium hydroxide solution added portionwise at 0 to 5°. The mixture is made alkaline with a 40% sodium hydroxide solution, filtered through highly purified fuller's earth and acidified with concentrated hydrochloric acid whilst cooling with ice. The precipitated 4-benzylthio-indole-2-carboxylic acid is filtered off with suction and recrystallised from ethanol and ethanol/glacial acetic acid. Melting point 191–192°. Keller's colour reaction: chrome green like. Van Urk's colour reaction: negative.

(d) *4-benzylthio-indole.*—2.11 g. of 4-benzylthio-indole-2-carboxylic acid are decarboxylated in a distillation column at 15 mm. of Hg and 210°. The temperature is increased to 240° and the mixture then distilled in a high vacuum. The distillate is taken up in ether, shaken twice with a 10% soda solution and the ethereal solution dried over potash. The evaporation residue of the solution is again distilled at 0.02 mm. of Hg and 155°. Melting point of the solidified distillate 32–35°. Keller's colour reaction: before shaking, violet, then brown. Van Urk's colour reaction: turbid violet.

It is to be noted that the cyclisation may also be effected with ferrous hydroxide instead of sodium dithionite.

EXAMPLE 3.—1-METHYL-4-BENZYLTHIO-INDOLE 1 g. of 4-benzylthio-indole is added to a solution of potassium amide, prepared from 350 mg. of potassium, in liquid ammonia, and the mixture stirred for 35 minutes at a temperature of −60 to −70°. A solution of 1.68 g. of methyl iodide in 10 cc. of absolute ether is added, the mixture stirred for a further two hours at this temperature and the ammonia then evaporated at room temperature. The residue is shaken between ether and water, the ethereal phase dried over magnesium sulphate and evaporated to dryness. The residue is distilled in a high vacuum. The 1-methyl-4-benzylthio-indole distils at 182–186°/0.001 mm. of Hg and crystallises from ether in the form of prisms having a melting point of 86–88°. Keller's colour reaction: light red violet. Van Urk's colour reaction: violet.

EXAMPLE 4.—1-BENZYL-4-BENZYLTHIO-INDOLE

This compound is produced from 4-benzylthio-indole with potassium amide and benzyl bromide in liquid ammonia in a manner analogous to that described above.

The 1-benzyl-4-benzylthio-indole is distilled in a high vacuum at 208–212°/0.001 mm. of Hg. The solidified distillate melts at 59–62°. Keller's colour reaction: grey olive green. Van Urk's colour reaction: turbid lilac.

Having thus disclosed the invention, what we claim is:
1. Indole derivatives of the formula

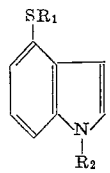

wherein $R_1$ is a member of the group consisting of lower alkyl and phenyl lower alkyl and $R_2$ is a member of the group consisting of hydrogen, lower alkyl, lower alkenyl and phenyl lower alkyl.
2. 4-benzylthio-indole.
3. 1-methyl-4-benzylthio-indole.
4. 1-benzyl-4-benzylthio-indole.

References Cited in the file of this patent
UNITED STATES PATENTS 3,074,960    Archer _____ Jan. 22, 1963

OTHER REFERENCES

Troxler et al.: Helv. Chim, Acta., volume 42, pages 2073–2099 (1959).

Lowy et al.: An Introduction to Org. Chemistry, page 213 (1945).

Piers et al.: Canadian Jour. Chem. 40, 511–517 (1962).